(12) United States Patent
Trede et al.

(10) Patent No.: US 6,318,764 B1
(45) Date of Patent: Nov. 20, 2001

(54) DETACHABLE RAPID-ACTION COUPLING DEVICE

(75) Inventors: Michael Trede, Rixheim; Erminio Moretti; David Letort, both of Grenoble, all of (FR)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 09/424,828

(22) PCT Filed: May 13, 1998

(86) PCT No.: PCT/EP98/02815

§ 371 Date: Nov. 29, 1999

§ 102(e) Date: Nov. 29, 1999

(87) PCT Pub. No.: WO98/54503

PCT Pub. Date: Dec. 3, 1998

(30) Foreign Application Priority Data

May 30, 1997 (DE) .............................. 197 22 842

(51) Int. Cl.[7] .............................. F16L 37/133; F16L 37/14
(52) U.S. Cl. .................. 285/305; 285/308; 285/321; 285/319
(58) Field of Search .................... 285/305, 308, 285/319, 321, 924

(56) References Cited

U.S. PATENT DOCUMENTS

| | | | |
|---|---|---|---|
| 4,721,331 | * | 1/1988 | Lemelshtrich ............... 285/305 |
| 5,074,601 | * | 12/1991 | Spors et al. ............... 285/308 |
| 5,090,747 | * | 2/1992 | Kotake ...................... 285/305 |
| 5,542,717 | * | 8/1996 | Rea et al. .................. 285/319 |
| 5,653,475 | * | 8/1997 | Scheyhing et al. ........... 285/308 |
| 5,683,117 | * | 11/1997 | Corbett et al. ............. 285/319 |
| 5,924,746 | * | 7/1999 | Fixemeer ................... 285/93 |
| 5,941,577 | * | 8/1999 | Musellec ................... 285/317 |
| 6,082,779 | * | 7/2000 | Lesser et al. .............. 285/93 |
| 6,155,612 | * | 12/2000 | Szabo ...................... 285/319 |
| 6,173,998 | * | 1/2001 | Bock ....................... 285/319 |

FOREIGN PATENT DOCUMENTS

| | | | |
|---|---|---|---|
| 2611233 | * | 9/1977 | (DE) ....................... 285/308 |
| 19708377-C1 | * | 6/1998 | (DE) ....................... 285/308 |
| 605801-A1 | * | 12/1993 | (EP) ....................... 28/308 |

* cited by examiner

Primary Examiner—Eric K. Nicholson
(74) Attorney, Agent, or Firm—Gifford, Krass, Groh, Sprinkle, Anderson & Citkowski, P.C.

(57) ABSTRACT

The invention relates to a detachable rapid-action coupling device designed to receive a tubular plug-in element (3) having a circular retaining rib (4). Said device comprises a receiving housing (1) having a cylindrical receiving space (6) for introducing the plug-in element (3) and a separate retaining element (2) made of hard-elastic plastic material and having elastically expandable retaining edges (17) facing inwards in the shape of an arc of a circle, which edges serve to engage the retaining rib (4) from behind after the plug-in element (3) has been introduced. The retaining element (2) can be pushed in from the outside in an opening (11) of the housing wall (5) to release the plug-in element (3). The receiving space (6) consists of three stepped sections. The housing (1) is embodied as a two-part structure. In order to move the opening (11) for pushing in and releasing the retaining element (2) into a better position, if necessary, when only limited space is available. The head part (8) can be connected to the base body (16) in an axial direction and has a centering bush (19) at the plug-in side.

5 Claims, 2 Drawing Sheets

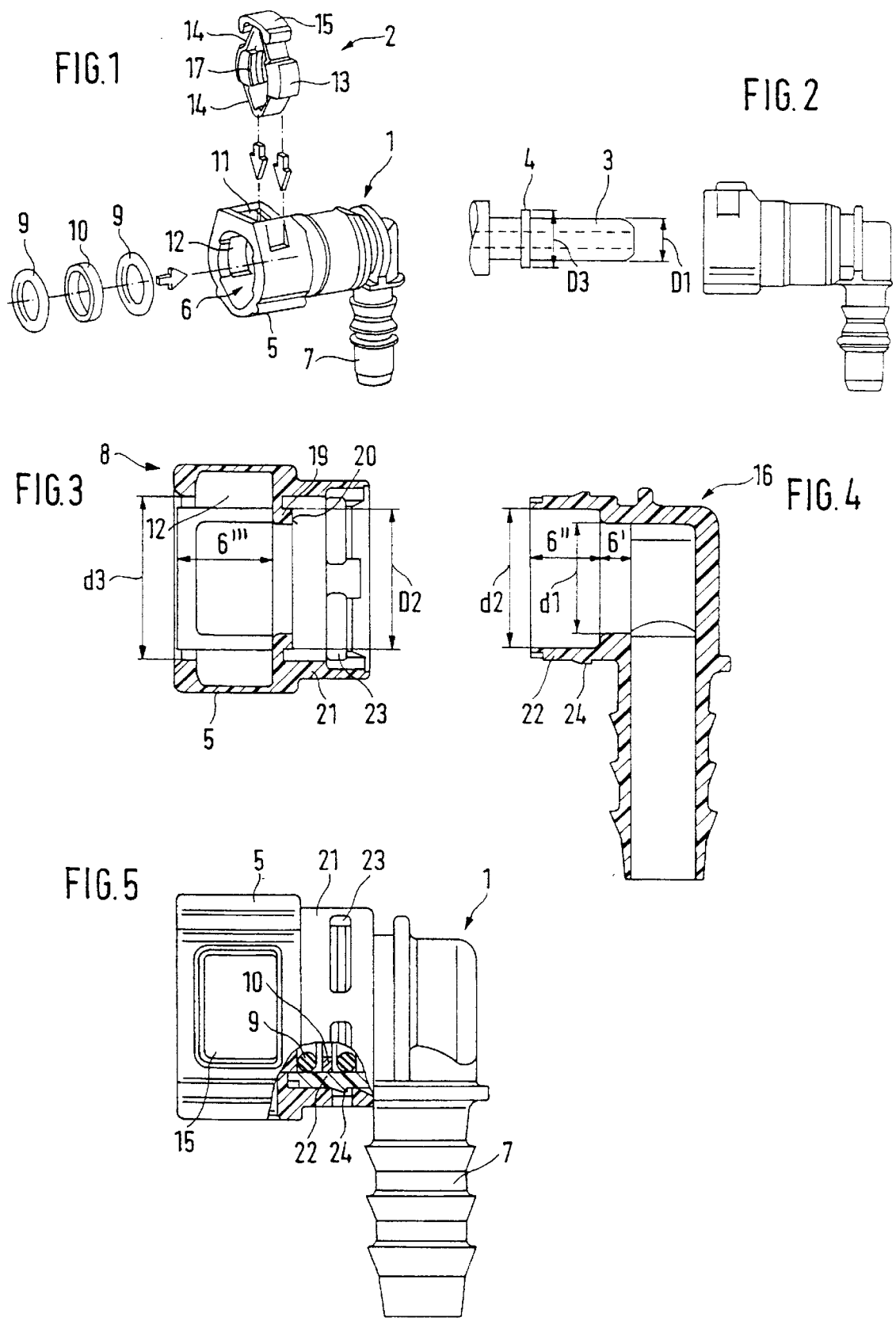

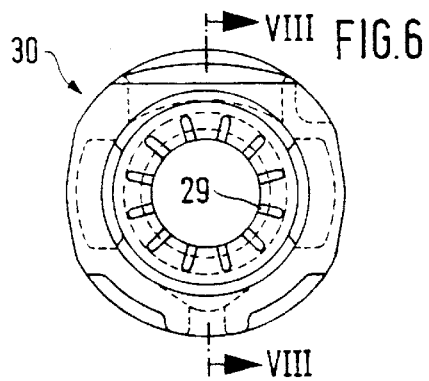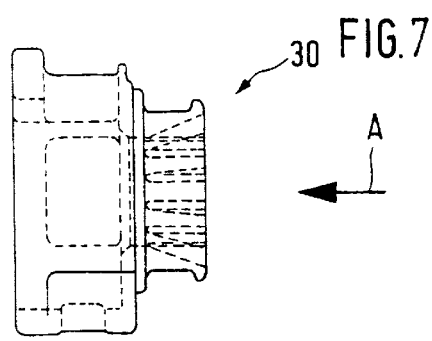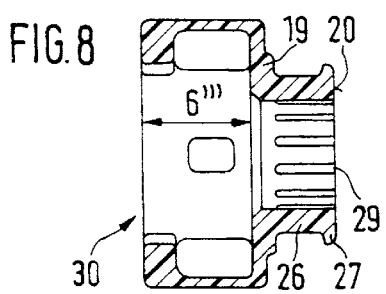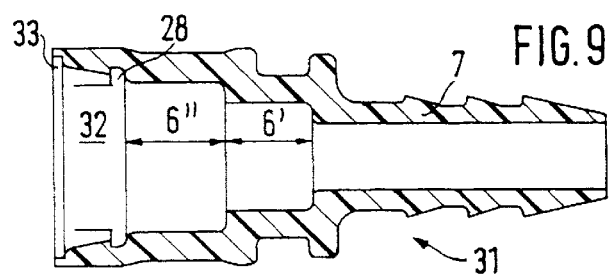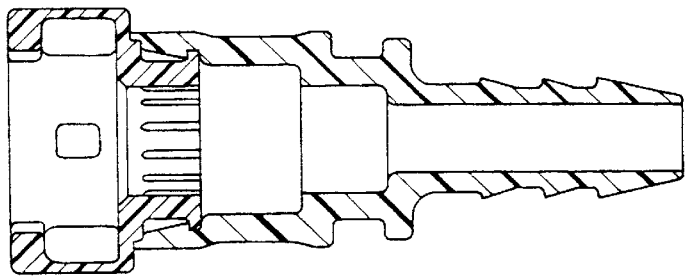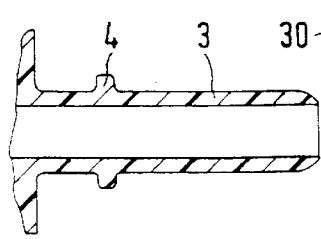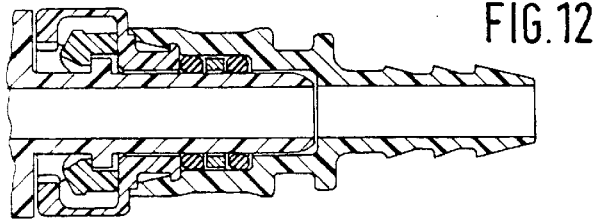

DETACHABLE RAPID-ACTION COUPLING DEVICE

The present invention pertains to a detachable rapid-action coupling device of the type described in the preamble of claim 1. Such a coupling device is known, for example, from EP 0 605 801 B1. Rapid-action coupling devices of this type are, among other things, used in the automobile industry for connecting fuel lines to one another or to plug-in elements that are integrally formed or otherwise mounted onto fuel containers or fuel distributors. In this case, it is not only important to achieve a simple manipulation when producing the connection and an absolutely tight connection after the plug-in element is engaged in the housing of the coupling device, but also it must be possible to easily disengage the coupling if so required. This is achieved in superior fashion with the rapid-action coupling device according to the present invention.

The shape of the housing of the coupling device is defined, among other things, by the circumstances at the given connection point. The housing is not always designed in the form of a linear extension of the plug-in element, but also must be available in angled variations due to constricted space conditions and the installation direction of the fuel lines. In such instances, it may occur that the pressure plates of the retaining elements are difficult to access and the coupling cannot be easily disengaged.

Consequently, the present invention is based on a coupling device known from DE 39 29 723 C2, in which the receptacle housing is realized in the form of a two-part component. In this case, the head part that is equipped with the retaining element can be axially plugged together with the base body that can be connected to the fuel line in captive fashion, with the head part containing a centering ring on the plug-in side, the end surface of which simultaneously serves as an end part for the central section. In order to eliminate the disadvantage of an obstructed access which also exists with this coupling device, the connection between the head part and the base body is produced with the means disclosed in the claim The present invention provides two possibilities for producing the plug connection; both are illustrated in the drawings and discussed in greater detail below in the description of the drawings.

Shown are:

FIG. 1, the receptacle housing of a rapid-action coupling device with installation parts in the form of an exploded perspective view;

FIG. 2, the receptacle housing with the plug-in element before the connection is produced;

FIG. 3, a section through the head part of a two-part receptacle housing;

FIG. 4, a section through the corresponding base body;

FIG. 5, a side view of the assembled receptacle housing which is partially sectioned within the engagement region;

FIG. 6, the head part of another embodiment of a two-part receptacle housing viewed in the direction of the arrow A;

FIG. 7, a side view of the same head part;

FIG. 8, a section through the head part along the line VIII—VIII in FIG. 6;

FIG. 9, a longitudinal section through the corresponding base body;

FIG. 10, a longitudinal section through the receptacle housing in the assembled condition;

FIG. 11, the same receptacle housing with installation parts in the mounted condition and the plug-in element before the connection is produced; and FIG. 12, the same receptacle housing after connecting the plug-in element, with the plane of section being turned 90°.

FIG. 1 indicates that the rapid-action coupling device shown in the figures consists of a receptacle housing 1 of plastic with a tubular connecting piece 7 that can be connected to a fluid line (not shown) and a cylindrical receptacle space 6 for inserting and engaging therein a tubular plug-in element 3 with a circumferential retaining rib 4 (see FIG. 2, left).

The plug-in element 3 may consist of the end of a stable metal tube that is used for fuel lines, for example. However, analogous to the receptacle housing, it may also consist of a rigid plastic material or another injection molded material that, analogous to the connecting piece 7 of the receptacle housing, can be connected to a fluid line or is integrally formed or otherwise mounted on a fuel container or fuel distributor.

A retaining element 2 of hard-elastic plastic material is located within the front region of the receptacle space 6. This retaining element can be inserted into the receptacle space 6 through an opening in the cylindrical housing wall 5. The retaining element 2 contains two retaining edges 17 that are directed inward in the shape of an arc of a circle, with said retaining edges conventionally engaging behind the retaining rib 4 after pressing in the plug-in element 3 such that the plug-in element 3 is coupled to the housing 1.

The retaining edges 17 are integrally formed onto two outwardly protruding support bodies 13 that in the installed condition of the retaining element 2 engage into corresponding recesses 12 in the housing wall 5 and are held opposite the plug-in direction at this location by end surfaces 18 that have the shape of an arc of a circle. The ends of the support bodies 13 are connected together by means of elastic projecting pieces 14 that converge in the shape of a V, with one of the connecting points being covered by an approximately rectangular pressure plate 15 that is slightly smaller than the opening 11 in the housing at its outer edges. Additional details regarding the retaining element 2 as well as its locking effect when inserting the plug-in element 3 are described in EP 0 605 801 B1, to the contents of which the present invention refers.

According to the present invention, the receptacle housing 1 is realized in the form of a two-part component that, as shown in FIGS. 3–5, consists of a head part 8 and a base body 16. In the embodiment shown, the base body is provided with a rectangularly bent connecting piece 7. The head part 8 and the base body 16 can be axially plugged together and thereby connected to one another, with the head part 8 containing a centering ring 19 on the plug-in side, the outside diameter D2 which corresponds to the inside diameter d2 of the base body 16.

An outer sleeve 21 is integrally formed onto the head part 8 concentrically with the centering ring 19. When pressing the head part 8 onto the base body 16, the sleeve is pushed over the outer wall 22 of the base body. The inner side of the sleeve 21 is provided with a locking groove 23 that can be engaged with a circumferential locking edge 24 that is integrally formed onto the outer wall 22. The locking groove 23 is preferably provided with several openings 25 that are uniformly distributed over the circumference and open toward the outside such that the reliable engagement of the locking edge 24 can be controlled in superior fashion.

FIGS. 3 and 4 show that the receptacle space 6 consists of three stepped sections. The section 6' which lies in the base body 16 has an inside diameter d1 that corresponds to the outside diameter D1 of the plug-in element 3. A second section 6", the inside diameter d2 of which corresponds to the outside diameter D2 of the centering ring 19, is located outwardly adjacent thereto, i.e., toward the plug-in side. The second section 6" serves for accommodating two annular seals 9 and an intermediate ring 10, which are shown in front of the opening 11 in FIG. 1 and in the installed condition in FIG. 5. The third, front section 6'" is located in the head part 8 and has an inside diameter d3 within the inlet region which corresponds to the outside diameter D3 of the retaining rib 4.

In the embodiment shown in FIGS. 6–12, the housing consists of a head part 30 and a base body 31. The head part also contains a locking sleeve 26 that, in contrast to the embodiment according to FIG. 3, is integrally formed onto the centering ring 19 and contains an outwardly protruding bead 27 on its free end. An inserting region 32 is correspondingly arranged on the base body 31 in front of the end of the central section 6", and a groove 28, the width and depth of which are adapted to the bead 27, is provided at the end of the section 6".

When assembling the head part 30 and the base body 31, the bead 27 engages into the groove 28 of the base body 31, with the centering ring 19 simultaneously engaging into a corresponding centering sleeve 33 at the beginning of the inserting region 32.

In order to ensure that the locking sleeve 26 can easily contract when it is pressed into the funnel-shaped inserting region 23, the locking sleeve 26 is interrupted by several slots 29 that are uniformly distributed over the circumference and, beginning at the end surface 20, extend over the entire length of the sleeve.

This type of engaging of the head part 30 in the base body 31 provides, in addition to the rotatability, the advantage that, after inserting the plug-in element 3 into the receptacle space 6, the slotted locking sleeve 26 is supported toward the inside such that the bead 27 is securely anchored in the groove 28 and the head part is secured against high withdrawal forces.

What is claimed is:

1. Detachable rapid-action coupling device for receiving a tubular plug-in element (3) with a circumferential retaining rib (4), consisting of a receptacle housing (1) with a tubular connecting piece (7) that is connected to a fluid line and a cylindrical receptacle space (6) for inserting the plug-in element (3), and of a separate retaining element (2) of a hard-elastic plastic material with inwardly directed elastic retaining edges (17) that have the form of an arc of a circle and engage behind the retaining rib (4) after insertion of the plug-in element (3), with the retaining element (2) being inserted into the receptacle space (6) through an opening (11) in the cylindrical housing wall (5) of the receptacle housing (1) and fixed axially to the housing wall (5) by means of the retaining edges (17), with the retaining element being able to be pressed inwardly from the outside within the opening region (11) of the housing wall (5) in order to disengage the plug-in element (3), and with the receptacle space (6) consisting of three stepped sections, the first, inner section (6') of which has an inside diameter (d1) that corresponds to the outside diameter (D1) of the plug-in element (3), the second, central section (6") of which is arranged outwardly adjacent to the first, inner section and serves for accommodating at least one annular seal (9) for the plug-in element (3), and the third, front section (6'") of which has an inside diameter (d3) within the inlet region which corresponds to the outside diameter (D3) of the retaining rib (4), characterized by the fact that the housing (1) is realized in the form of a two-part component, with a head part (8, 30) that contains the front section (6'") being able to be axially plugged together with a base body (16, 31) and thereby connected thereto, with the head part containing a centering ring (19) on the plug-in side, the end surface (20) of which simultaneously serves as an end part for the central section (6"), and with the connection being produced by means of locking elements (23/24) and (27/28), respectively, such that the head part (8, 30) is rotatably held on the outer wall (22) of the base body (16, 31).

2. Detachable rapid-action coupling device according to claim 1, with an outer sleeve (21) that is pushed over the outer wall (22) of the base body (16) when the head part (8) is connected to the base body, which is integrally formed onto the head part (8) concentrically with the centering ring (19), characterized by the fact that the inner side of the head part (8) is provided with a locking groove (23) that can be engaged with a circumferential locking edge (24) that is integrally formed onto the outer wall (22) of the base body (16).

3. Detachable rapid-action coupling device according to claim 2, characterized by the fact that the locking groove (23) contains several openings (25) that are uniformly distributed over the circumference and open toward the outside.

4. Detachable rapid-action coupling device according to claim 1, characterized by the fact that a locking sleeve (26) is integrally formed onto the centering ring (19) of the head part (30), with the free end of said locking sleeve containing an outwardly protruding bead (27) that can be engaged with a correspondingly wide and deep groove (28) in the outer wall (22) of the base body (31) at the beginning of the central section (6").

5. Detachable rapid action coupling device according to claim 4, characterized by the fact that the locking sleeve (25) is interrupted by several slots (29) that are distributed over the circumference and, starting at the end surface (20), extend over the entire length of the locking sleeve.

* * * * *

UNITED STATES PATENT AND TRADEMARK OFFICE
CERTIFICATE OF CORRECTION

PATENT NO. : 6,318,764 B1
DATED : November 20, 2001
INVENTOR(S) : Michael Trede

It is certified that error appears in the above-identified patent and that said Letters Patent is hereby corrected as shown below:

<u>Column 1,</u>
Line 5, replace "claim" with -- Claim --.
Line 39, replace "claim" with -- claim. --.

<u>Column 4,</u>
Line 25, replace "claim" with -- Claim --.
Line 35, replace "claim" with -- Claim --.
Line 39, replace "claim" with -- Claim --.
Line 48, replace "claim" with -- Claim --.

Signed and Sealed this

Fourth Day of June, 2002

*Attest:*

JAMES E. ROGAN
*Attesting Officer*   *Director of the United States Patent and Trademark Office*